2,897,111

DIPHENYL DISPERSIONS FOR THE IMPREGNATION OF PAPER

Arthur John Lloyd, deceased, late of Jordans, England, by Marion Amy Lloyd, Newton St. Loe, and Grahame Arnold Lloyd, Clifton, England, administrators, and Iris Winifred Preston, Iver, England, assignors to Monsanto Chemicals Limited, London, England, a British company No Drawing. Application December 28, 1955
Serial No. 555,770

10 Claims. (Cl. 167—30)

This invention relates to diphenyl dispersions suitable for the production of diphenyl-impregnated wrapping papers and similar materials for use in the preservation of fruit and other agricultural products, and especially in the preservation of citrus fruit, such as oranges, grapefruit, tangerines and lemons.

Citrus fruit after harvesting is normally washed before it is packed ready for distribution to the market. As the distance between the producing centre and the market is often very great, treatment before packing often includes additional steps for the preservation of the fruit so that minimum wastage occurs from attack by fungi or other deterioration before it reaches the consumer. Oranges, for instance, are particularly susceptible to damage by penicillia moulds and unless precautions are taken to minimise this damage considerable wastage ensues during the several days or even weeks which elapse between packing and consumption. Deterioration in quality is also often due to loss of moisture during this period, and appropriate conditions of packing and transport have to be provided to minimise this loss and ensure that the fruit reaches the consumer in good condition. Other fruit and agricultural products, for instance tomatoes, are often treated in a similiar way.

In order to control damage by fungi, it has been common practice to treat the citrus fruit with diphenyl, and various means of doing this have been adopted. At the same time deterioration due to loss of moisture has been controlled by the use of suitable packing conditions. One method of achieving these results is to wrap each fruit separately in a wrapping paper impregnated with diphenyl. The wrapping paper then lessens deterioration due to loss of moisture whilst the diphenyl reduces deterioration due to attack by fungi. The use of diphenyl in this way has proved particularly successful, partly because of its appreciable volatility, its non-toxic properties, and the fact that it does not taint the fruit.

However, wrapping papers impregnated with diphenyl have not hitherto been made use of to the fullest possible extent because of difficulties which are encountered in their manufacture. For instance, incorporation of the diphenyl in the pulp from which the wrapping paper is to be made is generally unsatisfactory, as the diphenyl tends to be distributed in a very uneven fashion throughout the finished paper. The impregnation of paper itself with diphenyl, on the other hand, is by no means a simple operation because diphenyl is a crystalline solid with a low solubility at room temperature in most of the otherwise suitable non-toxic solvents. The low solubility means of course that there are difficulties associated with the use of either diphenyl solutions themselves or emulsions in water of these solutions. For instance one method of impregnating wrapping papers with diphenyl relies on the use of a hot solution of diphenyl in a solvent, such as a mixture of liquid paraffin and paraffin wax, and this is an inconvenient procedure as at the necessary temperature considerable evolution of diphenyl vapours takes place.

It has now been found possible to apply diphenyl to paper and other materials used in packing fruit (and other agricultural products) by means of an aqueous dispersion containing finely-divided diphenyl dispersed in an aqueous medium having an adequate viscosity.

The present invention is therefore an aqueous dispersion suitable for application to paper and other materials employed in packing fruit and other agricultural products, comprising finely-divided diphenyl in an aqueous medium of viscosity sufficient to maintain the diphenyl in dispersion.

A process for treating paper (and other packing materials) using this aqueous dispersion of diphenyl, and the treated paper, are also considered to be within the scope of the invention.

The properties of the dispersions of the invention vary considerably with the particle size of the finely-divided diphenyl and the viscosity of the aqueous medium, and when preparing a dispersion suitable for use in any given set of circumstances these two factors will of course have to be taken into account. It is in any event a simple matter to find the viscosity of the aqueous medium which is necessary in order to disperse satisfactorily a sample of diphenyl of a given particle size.

The particle size of the diphenyl will of course be such that a dispersion can be prepared which is capable of being applied to the paper in the correct amount by the chosen method of application. An aqueous dispersion containing 25% by weight of diphenyl is convenient to work with, and in the following calculations given by way of example it will be assumed that such a dispersion is used. In general it is desirable to impregnate a wrapping paper (10 by 10 inches in size) for an orange with about 40 mg. of diphenyl, and if this is to be achieved by means of a continuous and uniform coating of the dispersion on the paper then the thickness of this coating should be 0.001 inch. Accordingly, it is clear in this instance that the dispersion should not contain many diphenyl particles larger in diameter than 0.001 inch. If on the other hand the dispersion is applied to the paper discontinuously, that is to say in the form of "dots," then larger diphenyl particles can be used, for instance particles up to 0.004 inch in diameter. However, packing materials such as paper box liners can be treated with a continuous uniform layer of a dispersion containing diphenyl particles up to 0.004 inch in diameter, as owing to the fact that more diphenyl should be incorporated than in wrapping papers a 0.004 inch thick coating of the dispersion gives suitable results.

Diphenyl can be dry ground to a suitable approximate particle size, for instance 0.0005, 0.001, or 0.004 inch (or any other suitable size within the range 0.0001 to 0.004 inch), in conventional equipment so long as care is taken to ensure that in this operation the temperature does not rise too near the melting point of diphenyl (71° C.).

The required viscosity of the aqueous medium in which the finely-divided diphenyl is to be dispersed can be obtained by means of various water-soluble high molecular weight substances, which will of course need to be non-toxic to humans and incapable of tainting the fruit. In addition, substances which are themselves liable to attack by fungi, such as gelatine, will in practice not be used in circumstances where there is any likelihood of this attack taking place. Substances which give suitable viscous aqueous solutions are for instance water-soluble salts of polymeric materials which contain carboxyl groups, such as water-soluble salts, for instance sodium and potassium salts, of carboxymethyl-cellulose, polymers and copolymers of acrylic and methacrylic acids, or copolymers of maleic acid. A particularly suitable substance is the sodium salt of a copolymer derived from styrene and maleic anhydride, for example the material sold under the name "Stymer S" ("Stymer" is a registered trademark). Aqueous solutions of Stymer S are easily obtained which can be used in the preparation of dispersions containing, for instance, particles of diphenyl up to 0.004 inch in size. Other substances which can be employed in the preparation of a suitably viscous aqueous medium are water-soluble polymeric materials (polymers and copolymers) which contain hydroxyl groups, for instance polyvinyl alcohol.

It is preferable in some instances to employ an aqueous dispersion of diphenyl which is particularly stable during storage and transport, and such a dispersion can be obtained by the addition of a protective colloid to the finely-divided diphenyl dispersed in the aqueous medium. A suitable protective colloid is an aqueous dispersion of polystyrene obtained by the emulsion polymerisation of styrene, for example that sold under the name "Lustrex Latex 45A" ("Lustrex" is a registered trademark). In some instances the substance which has been used to increase the viscosity of the aqueous medium will also be one which serves to some extent as a protective colloid in stabilising the diphenyl dispersion; water-soluble salts of carboxymethylcellulose are substances which are capable of both increasing the viscosity and acting as a protective colloid in this way.

The precise constituents of the dispersions of the invention and the quantities in which the constituents are present will naturally depend to some extent on how it is intended to use the dispersions. However, in many instances it is convenient to use a dispersion containing from 20 to 30% by weight of finely-divided diphenyl, and a very effective dispersion for application to paper of the type employed in making fruit wrappers contains 25% by weight of diphenyl having a particle size of not more than 0.001 inch, 7.5% by weight of the sodium salt of a copolymer derived from styrene and maleic anhydride, and 20% by weight of an aqueous dispersion of fine particles of polystyrene containing 45% by weight of polystyrene.

The aqueous dispersions of the invention can be formulated in a conventional manner using standard equipment. A convenient method to adopt is to mix the finely-divided diphenyl gradually into an aqueous medium sufficiently viscous to disperse the diphenyl particles satisfactorily, and then, if desired, to add an aqueous solution of a protective colloid. Thus finely-divided diphenyl having a particle size of not more than 0.004 inch can for instance be dispersed in a 10% by weight solution of Stymer S to give a dispersion containing 25% by weight of the diphenyl, and if desired Lustrex Latex 45A can then be added to this to give additional stability on storage; the latex can for instance be present in the final dispersion to the extent of 20% by weight.

If desired, the particle size of the finely-divided diphenyl can be still further reduced after it has been incorporated in the aqueous medium by milling the dispersion, for instance in a triple roll mill. When dispersions are prepared from diphenyl having a particle size of less than 0.001 inch it is in fact preferable to mill, or to stir vigorously, the final dispersion in order to break up any coarse aggregations which are sometimes formed by such fine particles. However, the tendency for particles less than 0.001 inch in diameter to aggregate together after grinding can be considerably reduced by the addition of a silica aerogel or similar inert powder to the diphenyl, either before or after it is ground to the final particle size.

The invention is illustrated by the following examples:

*Example 1*

The example describes the preparation and use of a dispersion of diphenyl in an aqueous solution of Stymer S (the sodium salt of a copolymer derived from styrene and maleic anhydride), which has been further stabilised by means of Lustrex Latex 45A (an aqueous dispersion of polystyrene obtained by emulsion polymerisation of styrene, containing 45% by weight of polystyrene).

475 cc. of water were warmed to about 50° C., and 75 g. of the Stymer S were added gradually with stirring. The stirring was continued until all the Stymer S had dissolved to give a viscous solution, which was then allowed to cool to room temperature. To this solution there were then added with stirring 250 g. of powdered diphenyl, all the particles of which were capable of passing the mesh of a No. 30 British Standard Sieve. The particle size of the diphenyl was further reduced by passing the dispersion of diphenyl in the Stymer S solution through a triple roll mill; this lowered the average particle size to about 0.004 inch diameter.

After the treatment in the triple roll mill, the dispersion was stabilised by the addition with stirring of 200 g. of the Lustrex Latex 45A.

The stabilised dispersion obtained in this way was a homogeneous white cream, containing 25% by weight of diphenyl, which possessed considerable stability. After 21 days' storage only a just discernible amount of sediment was found to have settled out.

The stabilised dispersion was successfully applied in a 0.004 inch coating to a thick paper of the type used for lining boxes in which citrus fruit is packed. A 0.004 inch coating had been calculated to be sufficient to give the required quantity of diphenyl on the paper in practice.

After drying, the paper was found to possess a diphenyl-containing film which adhered well and had no tendency to flake off, and the treated paper was in every way suitable for the preparation of box linings for use in the preservation of citrus fruit.

*Example 2*

This example describes the preparation and use of a diphenyl dispersion similar to that described in Example 1, except that the diphenyl particles were smaller in size.

An aqueous solution containing 22.5 g. of Stymer S dissolved in 142.5 cc. of water was prepared as described in Example 1, and to this cold solution 75 g. of finely-divided diphenyl, having an average particle size of 0.0004 inch, were added with stirring. After the diphenyl had been mixed in, the dispersion was passed once through a cone mill in order to break up some lumps of diphenyl which had been formed by aggregation of the fine particles.

After the treatment in the cone mill the dispersion was stabilised by the addition with stirring of 60 g. of Lustrex Latex 45A.

The stabilised dispersion was a homogeneous white cream, containing 25% by weight of diphenyl.

Tissue paper of the type used in wrapping citrus fruit was successfully treated with a 0.001 inch coating of the stabilised dispersion. After drying, the treated paper was found to possess a film containing diphenyl in a quantity adequate for the protection of oranges when each orange was wrapped in a sheet of paper 10 inches by 10 inches in size.

What is claimed is:

1. An aqueous dispersion containing 20% to 30% by weight of diphenyl wherein the particles of the said diphenyl are of a diameter in the range of 0.0001 to 0.04 inch, the dispersing agent being a non-toxic water-soluble salt of a copolymer of styrene and maleic anhydride.

2. The aqueous dispersion of claim 1 wherein the water-soluble salt dispersing agent is the sodium salt of a copolymer of styrene and maleic anhydride.

3. The aqueous dispersion of claim 2 containing a protective colloid.

4. The aqueous dispersion of claim 3 wherein the protective colloid is an aqueous dispersion of polystyrene.

5. The aqueous dispersion of claim 1 containing a protective colloid.

6. The aqueous dispersion of claim 5 wherein the protective colloid is an aqueous dispersion of polystyrene.

7. The process of treating paper and like materials employed in packing agricultural products, which comprises impregnating said materials with the composition of claim 1.

8. The process of treating paper and like materials employed in packing agricultural products, which comprises impregnating said materials with the composition of claim 2.

9. The process of treating paper and like materials employed in packing agricultural products, which comprises impregnating said materials with the composition of claim 3.

10. The process of treating paper and like materials employed in packing agricultural products, which comprises impregnating said materials with the composition of claim 5.

References Cited in the file of this patent

UNITED STATES PATENTS

| | | |
|---|---|---|
| 1,976,679 | Fikentscher et al. | Oct. 9, 1934 |
| 2,005,797 | Moore | June 25, 1935 |
| 2,173,453 | Mispley et al. | Sept. 19, 1939 |

OTHER REFERENCES

Citrus Magazine, Sci. Sec., July 1950, pp. 24–28.